Figure 1:
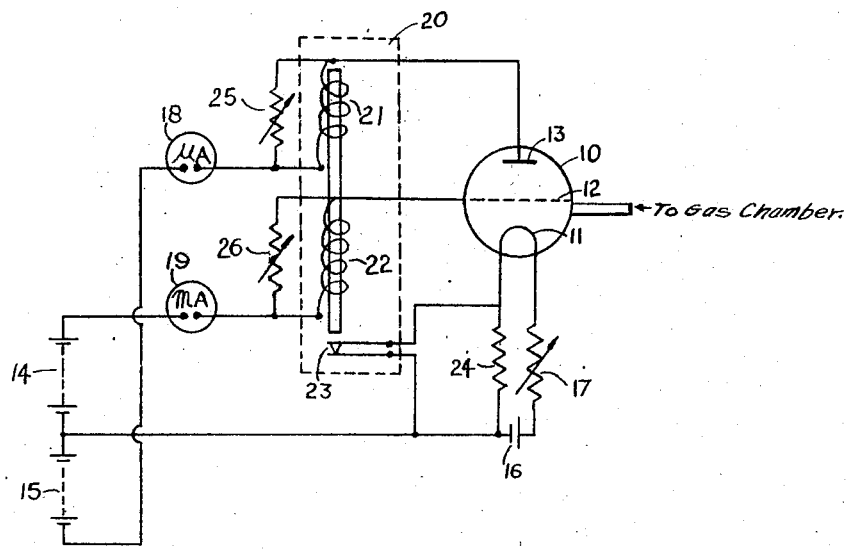

Sept. 2, 1952  F. H. TOWNSEND  2,609,423
ELECTRICAL APPARATUS FOR VACUUM MEASUREMENT
Filed May 8, 1946

Inventor
FREDERICK H. TOWNSEND
By
Emery Halcombe H Blair
Attorney

Patented Sept. 2, 1952

2,609,423

UNITED STATES PATENT OFFICE 2,609,423

ELECTRICAL APPARATUS FOR VACUUM MEASUREMENT

Frederick H. Townsend, Cambridge, England, assignor to Cathodeon Limited, Cambridge, England, a British company Application May 8, 1946, Serial No. 668,108
In Great Britain April 11, 1945

1 Claim. (Cl. 175—183)

The invention relates to improvements in that type of vacuum measuring apparatus known as an ionisation gauge.

The most favoured form of this type of gauge consists of a triode valve having a cathode, surrounding which is an open structure grid-like electrode, and surrounding this a plate-like electrode. In operation, a high positive potential (of the order of 150 volts or greater) is applied to one of these electrodes (hereinafter called the "accelerator"), and a low negative potential (of the order of 20 volts) is applied to the other electrode (hereinafter called the "collector"), both potentials being relative to the cathode potential. The gauge operates satisfactorily no matter which electrode is made "accelerator" and which is "collector," but the mode in which the inner grid-like electrode is made the "accelerator" and the outer plate-like electrode is made the "collector" is usually preferred, as this results in greater sensitivity, which is desirable when measuring low pressures.

When operating, the cathode of the gauge is heated until a specified current of electrons is flowing from the cathode to the accelerator. During their passage the electrons ionize some of the residual gas molecules in the gauge and the positive ions thus formed, flow to the collector. The magnitude of the current collected is, for a given value of electron current, an indication of the gas pressure in the gauge. Over a wide range (for vacua of the order of $10^{-3}$ mm. mercury and greater) this ion current is a linear function of the gas pressure. For many purposes this relationship is an advantage but it often occurs that this is not so, particularly when it is required to use the gauge to indicate a wide range of pressures (say from $10^{-3}$ down to $10^{-6}$ mm. mercury) or when "bursts" of gas are likely to occur during any processing on the pump system to which the gauge is connected. Owing to the low values of the collector current obtained at low pressures (usually less than one microampere at $10^{-6}$ mm. Hg), when working in this region it is necessary to use a sensitive indicating instrument. The range of such an instrument is essentially limited. For instance, if a meter of $100\mu$ A. full scale deflection is used and a current of $.5\mu$ A. indicates a pressure of $10^{-6}$ mm. Hg, then the upper limit of such a meter is $2\times10^{-4}$ mm. Hg. This range may of course be extended by shunting the meter when it is required to measure higher pressures, but this involves switching or some other specific manual act to change the meter range. Moreover, recourse to range switching and the like for altering the meter range cannot take care of and protect the meter against bursts of gas in the pump system, without sacrificing the sensitivity of the meter at high vacua.

It is, however, possible to modify the sensitivity of the gauge itself. The sensitivity of the gauge, i. e., the magnitude of the ionisation current flowing to the gauge collector for a given gas pressure in the gauge, is, over a wide range, dependent upon the values of the collector voltage, accelerator voltage and accelerator current. Accordingly, the gauge sensitivity may be modified by adjusting the potentials applied to the gauge electrodes or by altering the accelerator current. The sensitivity of the gauge is a direct function of the accelerator current over a wide range, but in the case of the collector and accelerator voltages the dependence of the gauge sensitivity thereupon holds good only over a more limited range. For a given accelerator current, the sensitivity of the gauge increases as the accelerator voltage is increased, up to a value beyond which no further increase takes place. Likewise, the gauge sensitivity increases as the collector voltage is increased negatively beyond an initial voltage, up to a limit value. The magnitudes of these "saturation" potentials depend to some extent on the constructional design of the gauge, but typical values are 150 volts positive on the accelerator and 20 volts negative on the collector.

The present invention makes use of the dependence of the gauge sensitivity upon the operating conditions just mentioned, for the purpose of overcoming the difficulties earlier discussed, by the provision of a method and of means for effecting automatic and continuous control of the gauge sensitivity by causing changes in the gas pressure in the gauge to control one or more of the above-mentioned operating conditions which determine the sensitivity of the gauge so that thereby the sensitivity of the gauge is modified in accordance with the changes of gas pressure. Thus, by this invention the overall sensitivity of the gauge may be automatically decreased when the gas pressure in the gauge increases, and by adjusting the degree of control, one meter may be made to cover any required range of pressures within the operating limits of this type of gauge without recourse to switching or other specific manual act necessary to change the sensitivity of the gauge or the range of the meter.

The method according to the invention of effecting such continuous and automatic control of the gauge sensitivity is susceptible of various modes of performance, and by way of illustration and exemplification two modes of operation will presently be described with reference to the accompanying drawings which are illustrative also of means suitable for accomplishing the described method of gauge sensitivity control. In the drawings, Fig. 1 is a circuit diagram of one arrangement in which the gauge sensitivity is controlled by controlling the accelerator current, and Fig. 2 is a circuit diagram of another arrangement in which the gauge sensitivity is controlled by controlling the collector voltage.

Before proceeding to a description of these embodiments, it may be remarked that the drawings are schematic in the sense that the typical arrangements shown are susceptible of various elaborations and refinements, some of which will be indicated as the description proceeds.

Figure 2:
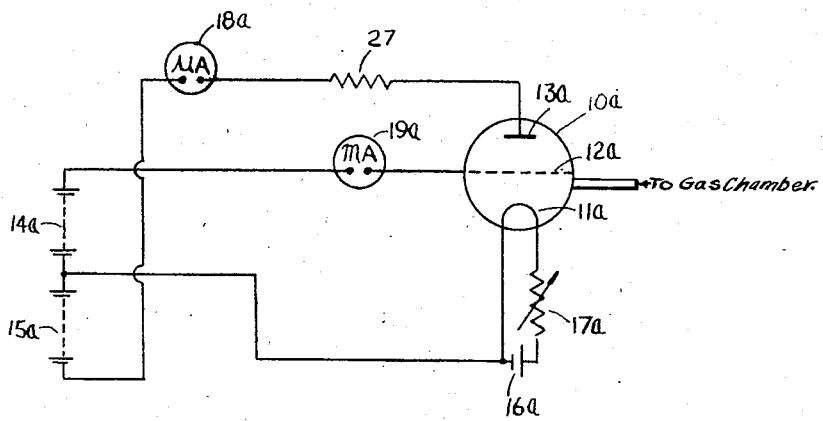

Referring now to Fig. 1, the ionisation gauge therein shown comprises a triode valve 10 with its envelope connected to the vacuum system under examination by means of a tube 9 and having a thermionic cathode or filament 11, a grid-like electrode 12 and a plate-like electrode 13. According to the usually preferred mode of operating the gauge, the electrode 12 is made the accelerator by application of a high positive potential (of the order of 150 volts or greater) thereto from a voltage source 14, and the electrode 13 is made the collector by application of a low negative potential (of the order of 20 volts) thereto from a voltage source 15. The filament 11 is supplied with heating current from a source 16 to cause it to emit electrons and a variable filament resistor 17 is provided for regulating the emission.

In use, the gauge is sealed to the vacuum system under examination so that the space enclosed by the envelope of the triode valve 10 forms part of the space included in the vacuum system so as to be subject to the gas pressures therein. When the gauge is in operation, the positive potential of the accelerator 12 causes electrons emitted from the cathode 11 to travel to the accelerator. During this passage the electrons ionize some of the residual gas molecules present in the gauge and the positive ions thus formed travel to and are collected by the collector 13. The magnitude of the ion current collected as indicated by the microammeter 18 is, for a given value of the emission (i. e., accelerator) current indicated by the milliammeter 19, an indication of the gas pressure existing in the triode 10 and hence in the vacuum system to which the gauge is sealed.

In the embodiment of the invention illustrated in Fig. 1, the triode 10 operates as an ionization gauge in conjunction with a relay indicated generally by the rectangle 20. This relay is shown as being of the current-operated electromagnetic type and has two coils 21 and 22, of which the coil 21 is in series with the collector electrode 13 of the triode 10 and the other coil 22 is in series with the accelerator electrode 12. The relay contacts 23 are connected in shunt with a resistor 24 arranged in series with the gauge filament 11, the relay contacts 23 normally being closed so as to short circuit the resistor 24. The relay coils 21 and 22 are arranged so that they assist each other in attracting the relay armature which, when attracted, opens the relay contacts 23 and thus places the resistor 24 in circuit. The relay coils 21 and 22 are provided with by-passing variable resistors 25 and 26 respectively.

The operation of the gauge is as follows. With no current through the relay collector coil 21, the emission of the gauge filament 11 (and hence the accelerator current) is adjusted by means of the variable resistor 17 to the value required for maximum sensitivity of the gauge. The relay accelerator coil 22 is then adjusted by means of the variable resistor 26, so that when this predetermined value of emission (accelerator) current is exceeded the increased accelerator current flowing through the accelerator coil 22 causes the relay armature to be attracted to open the relay contacts 23 and put the resistor 24 in circuit. The effect of this insertion of the resistor 24 is to reduce the filament heating current, thus causing the emission (accelerator) current to be reduced. The reduced accelerator current flowing through the accelerator coil 22, in turn, causes the relay armature to close the contacts 23, thus short circuiting the resistor 24, with the result that the emission (accelerator) current again rises. This cycle is repeated as necessary in order to maintain the mean value of the emission (accelerator) current at its prescribed value.

However, when current is allowed to flow in the collector circuit, the passage of this current through the relay collector coil 21 causes the relay contacts 23 to open at a lower value of emission (accelerator) current than the prescribed value above mentioned, and the greater the collector current, the lower will be the value of accelerator current at which the relay 20 will operate. Thus, when the gas pressure in the gauge increases, the collector current increases and progressively the mean accelerator current is decreased. This decrease in accelerator current means that the sensitivity of the gauge decreases, and therefore, taking the overall effect, increase in gas pressure results in decrease in gauge sensitivity. By adjusting the degree of control by by-passing some of the collector coil current through its variable resistor 25, the range of the gauge may be extended to cover any desired range of gas pressures within the operating limits of this type of gauge.

The described mode of control may also be performed with the relay accelerator coil 22 omitted, thus making the action of the relay 20 entirely dependent upon the magnitude of the collector current. With this modification, the relay action may be so adjusted that the inception of control is postponed until a predetermined value of collector current is reached. In this manner, the maximum sensitivity of the gauge may be maintained over any required portion of the high vacuum end of the range, the control of the emission (accelerator) current and hence of the gauge sensitivity being operative over the rest of the range.

It should be understood that although Fig. 1 shows this embodiment of the invention as employing current-operated electromagnetic relay means, this does not preclude the use of voltage-operated gas-filled relays or in fact any other means of utilising change in ion (collector) current to modify the emission (accelerator) current of the triode.

Another mode of accomplishing gauge sensitivity control in accordance with this invention is illustrated in Fig. 2, and is preferred owing to its simplicity.

In Fig. 2, circuit components corresponding to those in the embodiment of Fig. 1 bear the same reference numerals but with the distinguishing suffix "$a$". In the embodiment of Fig. 2, the triode 10$a$ is connected, together with its sources of operating potentials (14a, 15a) and filament heating current (16a), the filament resistor 17a and the indicating instruments 18a, 19a, in what would be a normal operating circuit for an ionisation gauge were it not for the fact that in accordance with this invention the triode 10a operates in conjunction with a resistor 27 which is inserted in series in the collector circuit, between the collector electrode 13a and its source of potential 15a.

The mode of operation of the gauge is as follows. With suitable accelerator and collector voltages applied as described to the accelerator 12a and collector 13a of the triode, the emission of the filament 11a is adjusted by means of its variable resistor 17a so that the emission (accelerator) current has the correct operating value. The ionisation (collector) current then flows through the resistor 27. When the collector current increases with increasing gas pressure in the gauge, the voltage drop across the resistor 27 also increases. If the source 15a of the collector voltage is kept constant, then increasing voltage drop across the resistor 27 results in the voltage actually applied to the collector electrode 13a being progressively decreased. As soon as this actual applied voltage drops below the saturation level already described, the sensitivity of the gauge decreases, i. e., the ion current collected at the collector 13a for a given gas pressure and a given accelerator current decreases. By selection of the value of the resistor 27, the rate of decrease may be chosen within wide limits, thus enabling the range of control to be suited to the meter used or to any other predetermined requirement.

By making the initial collector voltage higher than the saturation level, the initiation of the controlling action may be delayed until the voltage dropped across the resistor 27 becomes sufficient to overcome the excess voltage. Thus, at the high vacuum end of the range of the indicating instrument, maximum sensitivity may be maintained until a predetermined gas pressure is reached. It will be apparent that if the initial voltage applied to the collector 13a is equal to the saturation voltage, the sensitivity control will be effective over the whole range of the indicating instrument. On the other hand, if it is required to remove the controlling action for any specific purpose, the resistor 27 may be short circuited by means of a simple switch without further complications.

The described mode of control illustrated by Fig. 2 is only applicable when the gauge is operated with the outer plate-like electrode 13a thereof as the collector, as described, since if the inner grid-like electrode 12a were made the collector and the outer plate-like electrode 13a were made the accelerator, decrease in the collector voltage would cause the accelerator current to increase and so counteract the controlling effect of the varying collector voltage.

It is to be understood that although in Figs. 1 and 2 the operating voltages are depicted as being derived from batteries, this is merely illustrative and intended to typify any of the known sources of operating potentials, so that the use of other known methods of operating the ionisation gauge is not precluded, such as by the use of alternating voltages, rectified or otherwise, self-biassing circuits, and so forth. Likewise, neither does the showing of meters as the indicating instruments preclude the use of other instruments such as "magic eyes," with or without intermediate amplifiers. Also, notwithstanding anything herein described, any of the many known methods of stabilising the emission current of an ionisation gauge may be employed where desirable, without departing from the invention. The invention is thus susceptible of numerous practical embodiments and, furthermore, the embodiments herein specifically described are not exhaustive of the modes of controlling the gauge sensitivity in accordance with the main characteristic of the invention, which is that changes in the gas pressure in the ionisation gauge shall be utilised and caused to control one or more of the operating variables or conditions of the triode upon which its sensitivity is dependent, i. e., the collector voltage, the accelerator voltage or the accelerator current, so that the sensitivity of the gauge is caused to be modified automatically in accordance with the changes of gas pressure.

It may be pointed out that by means of the invention the following specific advantages are obtained:

1. Within the operating limits of the gauge, one meter or equivalent indicating instrument, which may be very sensitive for greatest deflection at the high vacuum end of the range, may be used to cover any range of vacua, without recourse to switching or other manual adjustment of the operating conditions of the gauge or of the instrument.

2. The overall sensitivity of the gauge may be adjusted, without sacrifice of sensitivity at high vacua, so that bursts of gas in the pump system cannot overload and so damage the indicating instrument.

3. The gauge sensitivity may be adjusted so that the scale of the indicating instrument shows a deflection which is approximately proportional to the logarithm of the gas pressure. This is of great convenience when a range of pressures of 1000/1 or greater is to be covered and the proportional accuracy of the gauge is approximately constant at all deflections.

I claim:

Method of measuring variable gas pressures in evacuated vessels, which comprises producing a steady electron current between a cathode and an anode in the vessel and causing said electron current to produce ionisation of gas within the vessel, maintaining a third electrode at a normal initial negative potential outside the space between said cathode and anode, so as to collect the ion current produced by ionisation, maintaining said anode at such positive potential that the ion current collected for any given gas pressure over the desired range is dependent solely upon the actual potential of said third electrode, causing said ion current to reduce the actual potential in a predetermined ratio with respect to said ion current of said third electrode, and adjusting the normal initial potential of said third electrode to a value such that, over at least part of the range of potential change of said third electrode due to gas ionisation, the magnitude of the ion current collected in proportion to the gas pressure is a substantially linear function of the actual potential of said third electrode, whereby over such part of said potential range the intensity of the ion current collected automatically decreases with increasing gas pressure and vice versa, thus varying the sensitivity of measurement inversely with changes in gas pressure.

FREDERICK H. TOWNSEND.

(References on following page)

REFERENCES CITED

The following references are of record in the file of this patent:

UNITED STATES PATENTS

| Number | Name | Date |
|---|---|---|
| 1,356,687 | Arnold | Oct. 26, 1920 |
| 1,372,798 | Buckley | Mar. 29, 1921 |
| 1,421,720 | Roberts | July 4, 1922 |
| 1,465,394 | Houskeeper | Aug. 21, 1923 |
| 1,566,279 | King | Dec. 22, 1925 |
| 1,649,016 | Buckley | Nov. 15, 1927 |
| 2,217,198 | Davisson | Oct. 8, 1940 |
| 2,375,280 | Calbick | May 8, 1945 |
| 2,442,518 | Stratton | June 1, 1948 |
| 2,455,437 | Nagel et al. | Dec. 7, 1948 |